United States Patent
Park et al.

(10) Patent No.: US 10,236,946 B2
(45) Date of Patent: Mar. 19, 2019

(54) DEVICE AND METHOD FOR BEAM FORMING FOR ESTIMATING DIRECTION OF TERMINAL

(71) Applicant: SK TELECOM CO., LTD., Seoul (KR)

(72) Inventors: Haesung Park, Seoul (KR); Changsoon Choi, Seoul (KR)

(73) Assignee: SK TELECOM CO., LTD., Seoul (KR)

(*) Notice: Subject to any disclaimer, the term of this patent is extended or adjusted under 35 U.S.C. 154(b) by 0 days.

(21) Appl. No.: 15/741,659

(22) PCT Filed: Jun. 30, 2016

(86) PCT No.: PCT/KR2016/007076
§ 371 (c)(1),
(2) Date: Jan. 3, 2018

(87) PCT Pub. No.: WO2017/007177
PCT Pub. Date: Jan. 12, 2017

(65) Prior Publication Data
US 2018/0205421 A1 Jul. 19, 2018

(30) Foreign Application Priority Data
Jul. 3, 2015 (KR) .................. 10-2015-0095511

(51) Int. Cl.
*H04B 7/0408* (2017.01)
*G01S 5/00* (2006.01)
(Continued)

(52) U.S. Cl.
CPC ............. *H04B 7/0408* (2013.01); *G01S 5/00* (2013.01); *G01S 5/10* (2013.01); *H04B 7/04* (2013.01);
(Continued)

(58) Field of Classification Search
CPC .................................................... H04B 7/0408
(Continued)

(56) References Cited

U.S. PATENT DOCUMENTS

| 7,336,750 B1* | 2/2008 | Han ........................ H04L 7/04 375/354 |
| 2004/0127230 A1* | 7/2004 | Bevan .................. H04W 64/00 455/456.5 |

(Continued)

FOREIGN PATENT DOCUMENTS

JP 2016057165 A 4/2016

OTHER PUBLICATIONS

International Search Report for PCT/KR2016/007076 dated Oct. 6, 2016.
(Continued)

*Primary Examiner* — Lihong Yu
(74) *Attorney, Agent, or Firm* — Hauptman Ham, LLP

(57) ABSTRACT

A beamforming device is provided. The beamforming device comprises: a beam deriving unit for deriving, among multiple reception beams, a first reception beam receiving, from a terminal, the first largest reception signal and a second reception beam receiving, from the terminal, the second largest reception signal; and a control unit for estimating the direction of the terminal on the basis of a ratio value between the size of the reception signal received through the first reception beam and the size of the reception signal received through the second reception beam.

8 Claims, 12 Drawing Sheets

(51) Int. Cl.
    *H04B 7/04*         (2017.01)
    *H04B 7/06*         (2006.01)
    *G01S 5/10*         (2006.01)
    *H04B 7/0456*     (2017.01)
    *H04L 5/00*         (2006.01)
    *H04B 7/08*         (2006.01)

(52) U.S. Cl.
    CPC ............... *H04B 7/046* (2013.01); *H04B 7/06* (2013.01); *H04L 5/0048* (2013.01); *H04B 7/0885* (2013.01)

(58) Field of Classification Search
    USPC ....................................................... 375/267
    See application file for complete search history.

(56) References Cited

U.S. PATENT DOCUMENTS

| | | |
|---|---|---|
| 2005/0136963 A1 | 6/2005 | Frank et al. |
| 2014/0274062 A1* | 9/2014 | Centonza .............. H04W 24/10 455/437 |
| 2015/0133173 A1 | 5/2015 | Edge et al. |

OTHER PUBLICATIONS

Japanese Office Action dated Oct. 2, 2018, in connection with the Japanese Patent Application No. 2017-567695.

\* cited by examiner

1

DEVICE AND METHOD FOR BEAM FORMING FOR ESTIMATING DIRECTION OF TERMINAL

CROSS REFERENCE TO RELATED APPLICATION

This present application is a national stage filing under 35 U.S.C § 371 of PCT application number PCT/KR2016/007076 filed on Jun. 30, 2016 which is based upon and claims the benefit of priority to Korean Patent Application No. 10-2015-0095511 filed on Jul. 3, 2015 in the Korean Intellectual Property Office. The disclosures of the above-listed applications are hereby incorporated by reference herein in their entirety.

TECHNICAL FIELD

The present invention relates to a beamforming device and a beamforming method, and more particularly to a beamforming device and a beamforming method in a higher frequency band-based wireless communication system using multiple antenna beams.

BACKGROUND

A lower frequency band of less than 6 GHz, which is mainly used in a current mobile communication, is fully used or fragmented with existing systems such as mobile communications, broadcasting, and satellite communications, which makes it difficult to secure ultra-wide bandwidth frequency for high-capacity data transmission.

As a result, a higher frequency band such as a centimeter wave of 6 GHz or above (an electromagnetic wave with a wavelength in centimeters corresponding to a frequency range of 3 to 30 GHz) or a millimeter wave (an electromagnetic wave with a wavelength in millimeters corresponding to a frequency range of 30 to 300 GHz) becomes a key spectrum of 5th generation.

Such a higher frequency band is advantageous for an implementation of an RF system, which is capable of widening operation bandwidth as a center frequency becomes higher, and it is possible to achieve a high density antenna. In other words, assuming a physical size is the same for each antenna in the higher frequency band, a physical distance between the radiators constituting the antenna is reduced as the frequency is higher. Therefore, a large number of radiators can be integrated in the antenna. Such radiators becomes a hardware basis for 3D beamforming that controls an amplitude and a phase of an RF signal to generate various types of antenna beams and massive multiple input multiple output (MIMO) technology that enables multiple transmissions.

Meanwhile, while the higher frequency band is advantageous in that a wide frequency band can be used therein compared to a cellular band as discussed above, there is a drawback to overcome high linearity and low diffraction characteristics of the higher frequency band and a relatively higher path loss. To this end, the increased path loss is overcome by forming a pencil beam having a high gain by utilizing a plurality of antenna radiators increased due to the use of a high frequency.

However, in the higher frequency band, a beam width becomes very narrower and the linearity of the electromagnetic waves becomes higher while the diffraction thereof becomes lower. Therefore, smooth communications cannot be achieved when the base station and the terminal are not able to utilize appropriate transmission/reception beams according to a location change of the terminal.

FIG. 1 shows an example of an antenna operation scheme in a conventional lower frequency band-based wireless communication system. FIG. 2 shows an example of an antenna beam pattern in the conventional lower frequency band-based wireless communication system.

Referring to FIGS. 1 and 2, the conventional lower frequency band-based wireless communication mainly utilizes a lower frequency band of less than 6 GHz in which path attenuation, i.e., path loss, of electromagnetic waves depending on a transmission/reception distance between a base station and a terminal is reduced. Thus, even when an antenna having a relatively wide beam width is applied thereto, a smooth communication link can be generated.

However, when an antenna having a wide beam width is used in a higher frequency band of 6 GHz or above which may be suitable for high-capacity data transmission in 5th generation of mobile communication, received electric field cannot be ensured due to high path loss.

FIG. 3 illustrates a conventional scheme for deriving an optimum antenna beam in the higher frequency band-based wireless communication. The scheme shown in FIG. 3 is a beam switching scheme for selecting a beam that guarantees the best wireless link among a plurality of preset antenna beam group (e.g., a base station antenna reception beam #1 to a base station antenna reception beam #N).

However, when the number of candidate antenna beams is small in a predefined antenna beam group or when the beam width of a candidate antenna beam is wide, there may be a problem that loss of electric field occurs even when electromagnetic waves are transmitted and received to a main lobe in the antenna beam.

Hereinafter, the problem in the conventional beam switching scheme will be described in more detail with reference to FIGS. 4 to 6.

FIG. 4 shows an example of an antenna beam pattern for each antenna beam index in the higher frequency band-based wireless communication. FIG. 5 is an enlarged view of a region between −10° and 10° shown in FIG. 4. The antenna beam pattern data shown in FIGS. 4 and 5 does not have continuous values, but discrete values at predetermined angular intervals.

FIG. 6 is a more specific illustration of the conventional scheme for deriving an optimum antenna beam in the higher frequency band wireless communication. In the conventional scheme for deriving the optimum antenna beam, as shown in FIG. 6, an amplitude of a reception signal received from the terminal for each antenna reception beam is compared with the others, and the antenna beam including a reception signal having the largest amplitude is selected as the optimum antenna reception beam. According to this scheme, when an angle of arrival (AoA) (i.e., an angle of a direction from the terminal to the base station with respect to the reference direction) of a signal from the terminal does not coincide with a directional angle (i.e., an angle at which the amplitude of the reception signal is maximum) of the selected optimum antenna reception beam (e.g., in FIG. 6, a base station antenna reception beam #3 is selected as the optimum reception beam, and the terminal is not located at a directional angle 0° of the base station antenna reception beam #3), the loss of the electromagnetic waves occurs as compared with the case where an angle of arrival of a signal from the terminal coincides with a directional angle of an optimum antenna reception beam. This loss can be generated by a difference between an amplitude of the electromagnetic wave at the directional angle of the optimum antenna reception beam and an amplitude of the electromagnetic wave at the intersection of the optimum antenna reception beam and the adjacent beam (base station antenna receive beam #2).

Conventionally, there is proposed another method to solve the problem of the beam switching scheme. Korean Patent Application Publication No. 2014-0065630 (published on May 30, 2014) discloses a method of obtaining a suitable beam by a recursive repetition in which an optimal beam between a base station and a terminal is first obtained by using an antenna beam having a wide beam width, and then the selected beam region is subdivided into antenna beams having narrow beam widths or a direction-of-arrival (DOA) method based on Maximum Likelihood (ML) to estimate a location of the terminal at each stage.

However, in the above described method, it is necessary to utilize the data received from the entire beam used in each stage and estimate the angle of the terminal (that is, the angle of arrival of the signal from the terminal) by a matrix calculation of the data, which requires a relatively large amount of calculation.

SUMMARY

In view of the above, the present invention provides a beamforming device and a beamforming method for generating an optimum antenna beam for a terminal by deriving, among multiple antenna beams in a higher frequency band-based wireless communication, a first antenna beam through which a reception signal having the largest amplitude is transmitted to a base station from a terminal and a second antenna beam through which a reception signal having the second largest amplitude is transmitted to the base station from the terminal; calculating a ratio of the amplitude of the reception signal of the first antenna beam to the amplitude of the reception signal of the second antenna beam; and accurately estimating an angle of the terminal with a relatively small amount of calculation by using a function indicating a relationship between the calculated ratio and a gain ratio of a target beam and an adjacent beam for each angle, which is stored in advance.

In accordance with an aspect of the present invention, there is provided a beamforming device including: a beam deriving unit configured to derive, among multiple reception beams, a first reception beam through which a reception signal having the largest amplitude is received from a terminal and a second reception beam through which a reception signal having the second largest amplitude is received from the terminal; and a control unit configured to estimate a direction of the terminal based on a ratio of the amplitude of the reception signal received through the first reception beam to the amplitude of the reception signal received through the second reception beam.

In accordance with another aspect of the present invention, there is provided a beamforming method including: deriving, among multiple reception beams, a first reception beam through which a reception signal having the largest amplitude is received from a terminal and a second reception beam through which a reception signal having the second largest amplitude is received from the terminal; estimating a direction of the terminal based on a ratio of the amplitude of the reception signal received through the first reception beam to the amplitude of the reception signal received through the second reception beam; and generating a reception beam through which a reception signal having the largest amplitude is received in the estimated direction of the terminal.

With such configuration, it is possible to generate an optimum antenna beam for a terminal by deriving, among multiple antenna beams in a higher frequency band-based wireless communication, a first antenna beam through which a reception signal having the largest amplitude is transmitted to a base station from a terminal and a second antenna beam through which a reception signal having the second largest amplitude is transmitted to the base station from the terminal; calculating a ratio of the amplitude of the reception signal of the first antenna beam to the amplitude of the reception signal of the second antenna beam; and accurately estimating an angle of the terminal (i.e., an angle of arrival of the signal received from the terminal) with a relatively small amount of calculation by using a function indicating a relationship between the calculated ratio and a gain ratio in the antenna pattern stored in advance.

Further, it is possible to overcome a high path loss problem in a higher frequency band-based wireless communication through the angle estimation of the terminal, thereby ensuring a high received signal strength. Therefore, it is advantageous that an optimal wireless link between the base station and the terminal can be generated and maintained.

DETAILED DESCRIPTION

Hereinafter, an operation principle of an embodiment of the present invention will be described in detail with reference to the accompanying drawings. In the following description of the embodiment of the present invention, a detailed description of known functions and configurations incorporated herein will be omitted as it may make the subject matter of the present invention unclear. Further, the following terms are defined in consideration of the functions used in the present invention, and may be changed according to the intention of a user or the like. Therefore, the definition should be determined based on the contents of the specification.

Figure 7:
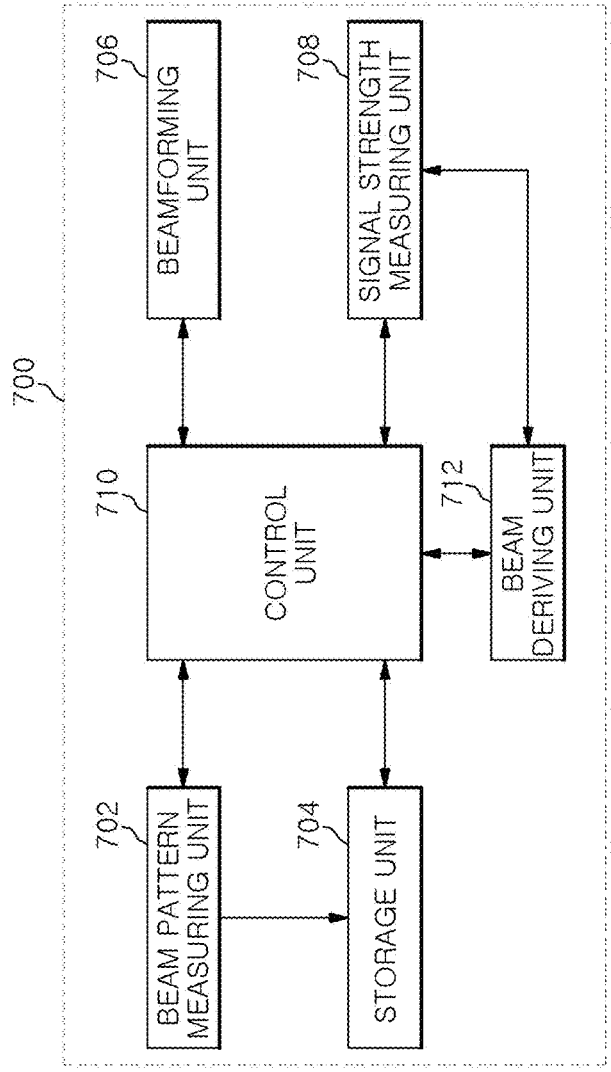
FIG. 7 is a block diagram of a beamforming device for estimating a direction of a terminal in accordance with an embodiment of the present invention.

FIG. 7 is a block diagram of a beamforming device for estimating a direction of a terminal in accordance with an embodiment of the present invention. The beamforming device 700 includes a beam pattern measuring unit 702, a storage unit 704, a beamforming unit 706, a signal strength measuring unit 708, a control unit 710, and a beam deriving unit 712 and the like. The beamforming device 700 may be a part of a base station having a plurality of antennas. At least a part of the beamforming device 700 may be implemented by a microprocessor.

Hereinafter, each component of the beamforming device 700 according to the embodiment of the present invention will be described in detail with reference to FIG. 7.

Figure 1:
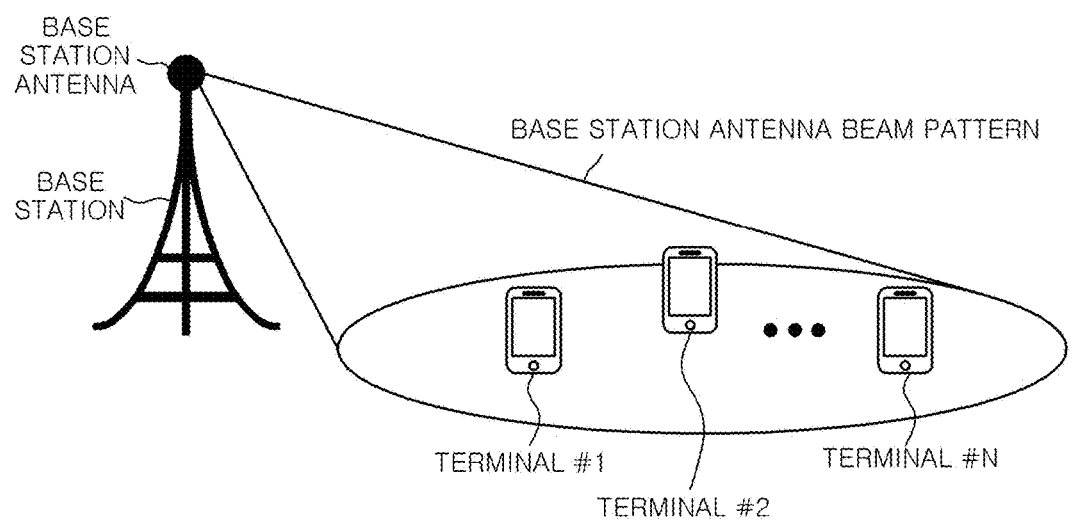
FIG. 1 shows an example of an antenna operation scheme in a conventional lower frequency band-based wireless communication system.
Figure 2:
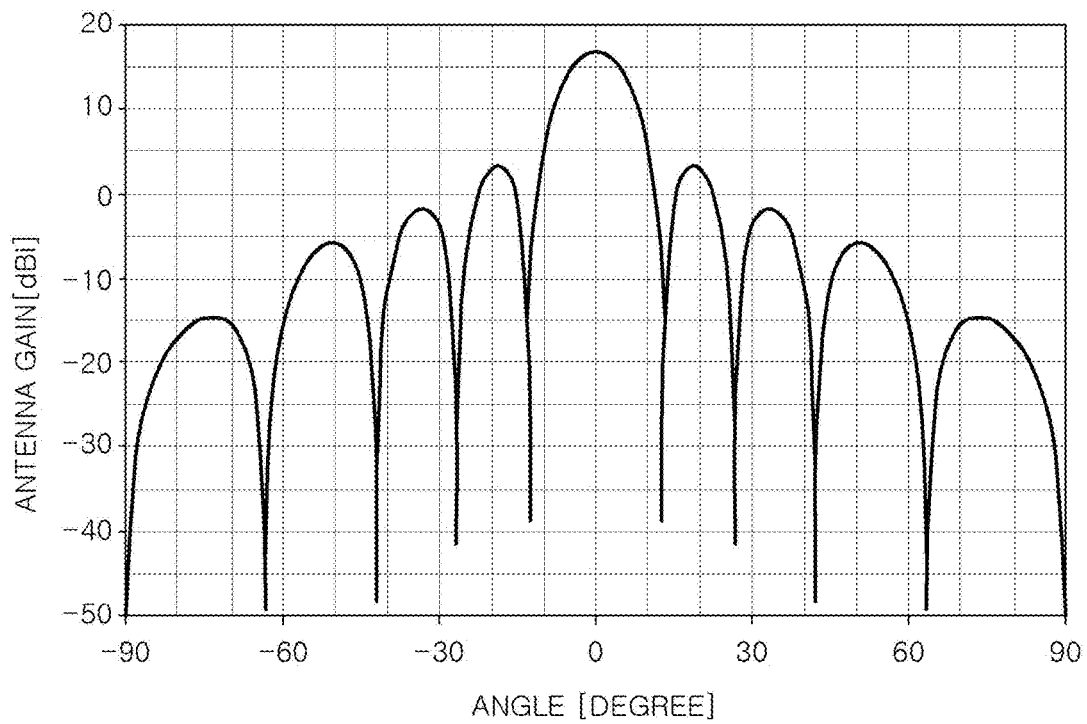
FIG. 2 shows an example of an antenna beam pattern in the conventional lower frequency band-based wireless communication system.
Figure 3:
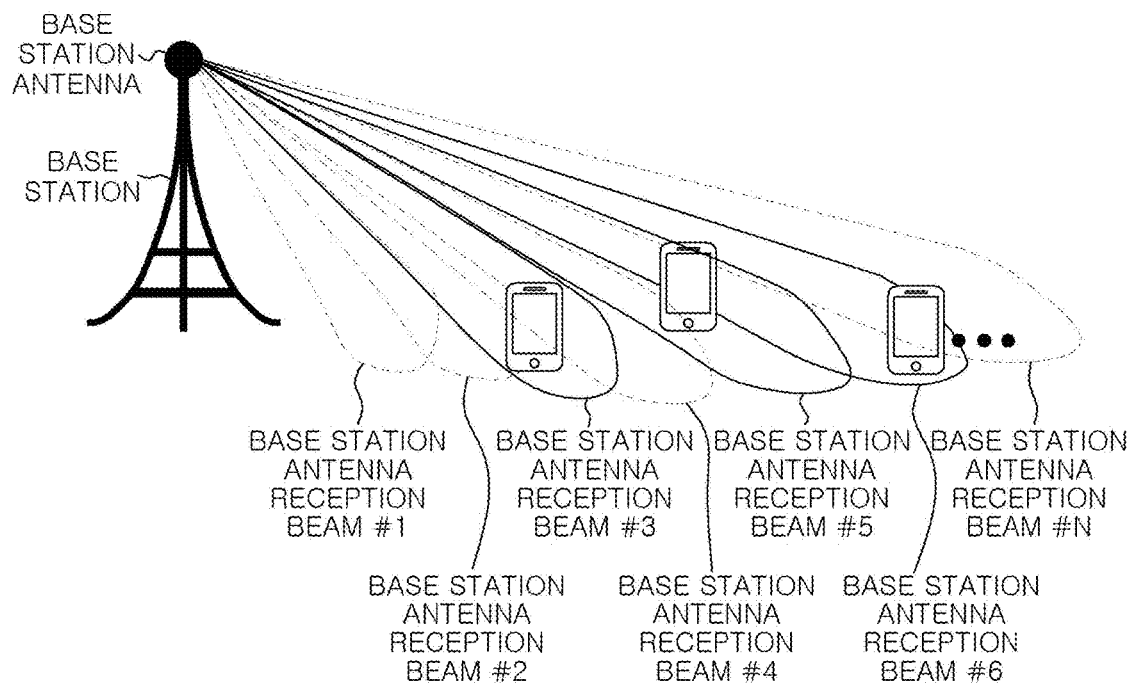
FIG. 3 illustrates a conventional scheme for deriving an optimum antenna beam in the higher frequency band-based wireless communication.
Figure 4:
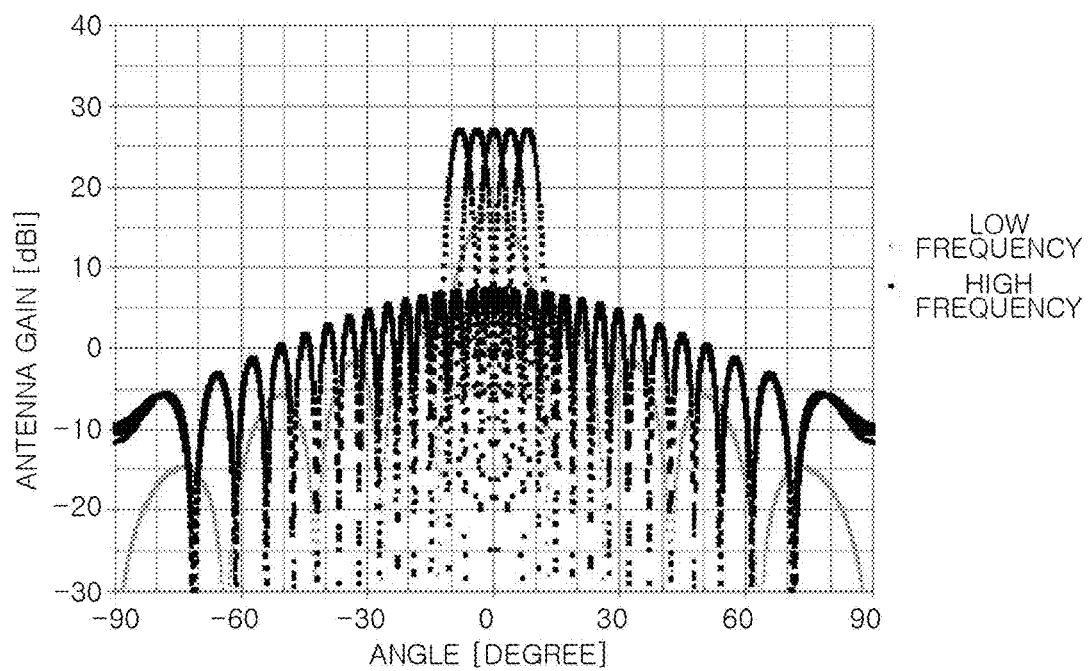
FIG. 4 shows an example of an antenna beam pattern for each antenna beam index in the higher frequency band-based wireless communication.
Figure 5:
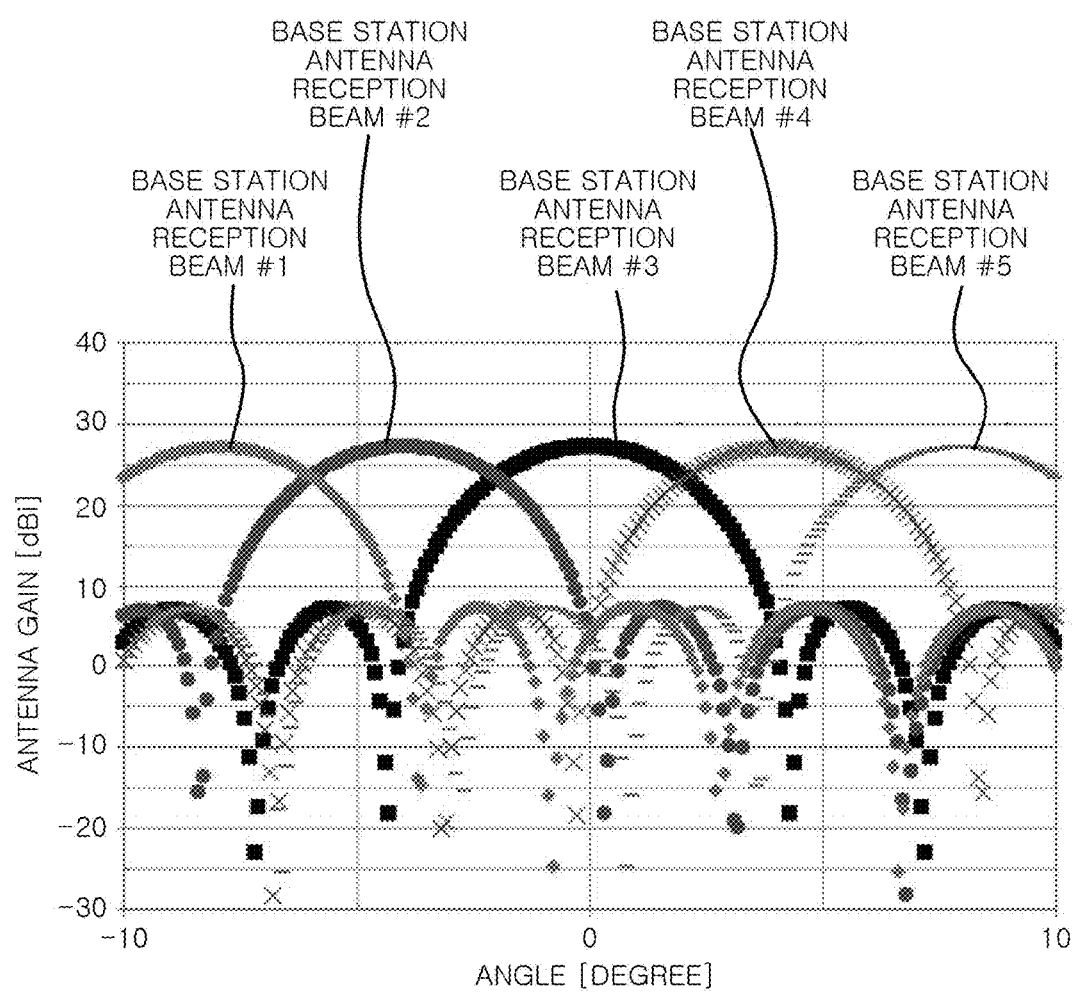
FIG. 5 is an enlarged view of a region between −10° and 10° shown in FIG. 4.
Figure 6:
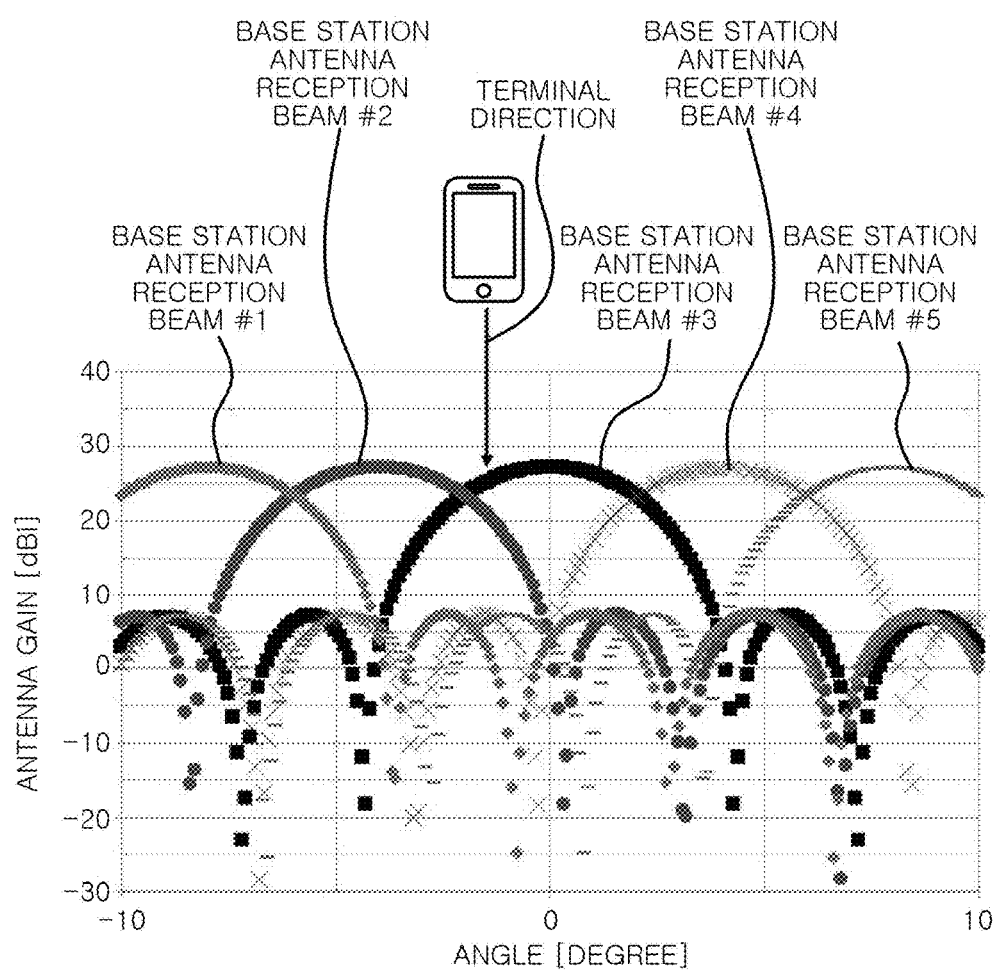
FIG. 6 is a more specific illustration of the conventional scheme for deriving an optimum antenna beam in the higher frequency band wireless communication.

The beam pattern measuring unit 702 is configured to measure a beam pattern of each of a plurality of reception beams generated by the beamforming unit 706 (for example, as in FIG. 5). The beam pattern indicates a gain at an angle (i.e., a direction). The measurement of the beam pattern can be performed for a finite number of angles. The beam pattern measuring unit 702 is also configured to derive, from the measured beam pattern, a ratio of a gain of a target beam and a gain of an adjacent beam for each angle and a trendline equation thereof. The target beam at a particular angle is a reception beam having the largest gain at the particular angle among the plurality of reception beams. The adjacent beam at a particular angle is a reception beam having the second largest gain at the particular angle among the plurality of reception beams. At this time, the beam pattern measuring unit 702 stores information on the gain ratio of the target beam and the adjacent beam for each angle derived therefrom and the trendline equation thereof in the storage unit 704. In this manner, the control unit 710 can make access to the information stored in the storage unit 704 in a process of estimating a direction of a terminal and an optimum beamforming based on the estimation according to the embodiment of the present invention. The beam pattern measuring unit 702 may include a microprocessor or may be implemented by the microprocessor.

The storage unit 704 may be configured to store, e.g., the aforementioned information on the gain ratio of the target beam and the adjacent beam for each angle and the trendline equation thereof.

The beamforming unit 706 is configured to generate multiple beams of high-frequency band (e.g., a centimeter wave or millimeter wave of 6 GHz or above) and perform a beamforming toward the terminal. That is to say, the beamforming unit 706 may generate multiple transmission beams for signal transmission to the terminal and further generate multiple reception beams for signal reception from the terminal. The beamforming unit 706 may generate multiple beams through an analog beamforming, a digital beamforming or a hybrid beamforming which is a combination of the analog beamforming and the digital beamforming. In the analog beamforming, beams are sequentially and respectively generated from different basebands. In the digital beamforming, multiple beams are generated in parallel and simultaneously from different basebands.

In order to perform the analog beamforming, the digital beamforming or the hybrid beamforming, the beamforming unit 706 may include various components, such as a baseband unit, a phase shifter, a low noise amplifier and a mixer. The details of such components will be omitted since general configurations of those components are already known in the related art of the beamforming.

The beamforming unit 706 may generate a reception beam in a direction of the estimated terminal under the control of the control unit 710. This will be described in detail later.

The signal strength measuring unit 708 is configured to receive a signal transmitted from the terminal. For example, when the terminal transmits a random access channel (RACH) preamble or a sounding reference signal (SRS), the signal strength measuring unit 708 calculates an amplitude (i.e., electric field strength) of the reception signal (RACH preamble or SRS) received from the terminal for each of the multiple reception beams generated by the beamforming unit 706. That is to say, the signal strength measuring unit 708 may calculate the amplitude of the reception signal received from the terminal through the reception beam of each antenna of the base station.

Here, when the beamforming unit 706 generates the reception beams by employing the analog beamforming, the signal strength measuring unit 708 sequentially derives the amplitudes of the reception signals for respective reception beams. When the beamforming unit 706 generates the reception beams by employing the digital beamforming, the signal strength measuring unit 708 simultaneously and parallelly derives the amplitudes of the reception signals for respective reception beams.

The beam deriving unit 712 is configured to derive information on the target beam (first reception beam) and the adjacent beam (second reception beam). Specifically, when the beam deriving unit 712 receives information on the amplitude of the reception signal from the terminal for each reception beam generated from the beamforming unit 706 through the signal strength measuring unit 708, the beam deriving unit 712 compares the amplitudes of the reception signals of the respective reception beams to derive information on the target beam, which is a reception beam including a reception signal having the largest amplitude, and the adjacent beam, which is adjacent to the target beam and is a reception beam including a reception signal having the second largest amplitude. The beam deriving unit 712 transmits the information on the target beam and the adjacent beam to the control unit 710. The beam deriving unit 712 may include a microprocessor or may be implemented by the microprocessor.

The control unit 710 is configured to calculate a ratio of the amplitude of the reception signal received from the terminal through the target beam and the amplitude of the reception signal received from the terminal through the adjacent beam. Further, the control unit 710 is configured to extract information corresponding to a pair of the target beam and the adjacent beam extracted by the beam extracting unit 712 from the information about the ratio of the gain of the target beam and the gain of the adjacent beam and the trendline equation for each angle stored in the storage unit 704, and estimate a direction of the terminal (i.e., a direction from the beamforming device 700 to the terminal) by applying the calculated ratio value to the extracted information. The direction of the terminal may be indicated by an angle. In addition, the control unit 710 is also configured to calculate an offset value, which is an angle at which the direction of the terminal is offset with respect to the direction of the target beam (i.e., the direction through which the electromagnetic wave can be most strongly received through the target beam).

Further, the control unit 710 is also configured to control the beamforming unit 706 to generate a reception beam in the estimated direction of the terminal (that is, the offset value is made to be '0'). Therefore, the control unit 710 may transmit information on the estimated direction of the terminal or information on the calculated offset value to the beamforming unit 706. The beamforming unit 706 generates a reception beam in which the largest reception signal is received in the estimated direction of the terminal, that is, a reception beam which most strongly receives the electromagnetic wave. In other words, a reception beam which is directed in the direction of the estimated terminal is generated, so that the electric field strength of the transmission and the reception between the terminal and the beamforming device 700 (i.e., the base station) can be improved. Based on the calculated offset value, the beamforming unit 706 may generate an optimum reception beam by shifting the target beam for the reception signal from the terminal to make the offset value become zero. The control unit 710 may include a microprocessor or may be implemented by the microprocessor.

As described above, in the embodiment of the present invention, there can be derived, among the multiple reception beams, the reception beam (i.e., the target beam) in which the reception signal having the largest amplitude is received from the terminal and the reception beam (i.e., the adjacent beam) in which the reception signal having the second largest amplitude is received from the terminal. Then, the ratio between the amplitudes of the reception signals received through the target beam and the adjacent beam is calculated, so that the direction of the terminal and the offset value, which is an angle between the direction of the terminal and the direction of the target beam, can be obtained with relatively small amount of calculation. Specifically, the beam pattern measuring unit 702 measures in advance the beam patterns of the multiple reception beams, and calculates the gain ratio of the target beam to the adjacent beam for each angle. These results may be databased and stored in the storage unit 704 or the simplified trendline equation may be created by using the curve fitting and stored in the storage unit 704. When a signal is received from the terminal, the ratio of the amplitude of the reception signal in the target beam and the amplitude of the reception signal in the adjacent beam for the received signal from the terminal is substituted into the trendline equation, so that it is possible to estimate the direction of the terminal and the offset value between the direction of the terminal and the direction of the target beam without a complex calculation. In the conventional higher frequency band wireless communication system, it is not possible to guarantee a low latency because a complex calculation is required for the estimation of an optimum antenna beam and even it takes long time for the complex calculation. However, in accordance with the embodiment of the present invention, it becomes possible to accurately estimate the direction of the terminal and the offset value between the direction of the terminal and the direction of the target beam with a relatively small amount of calculation.

Hereinafter, an operation example of the beamforming device 700 in accordance with the embodiment of the present invention will described in more detail with reference to FIGS. 8 to 11.

Figure 8:
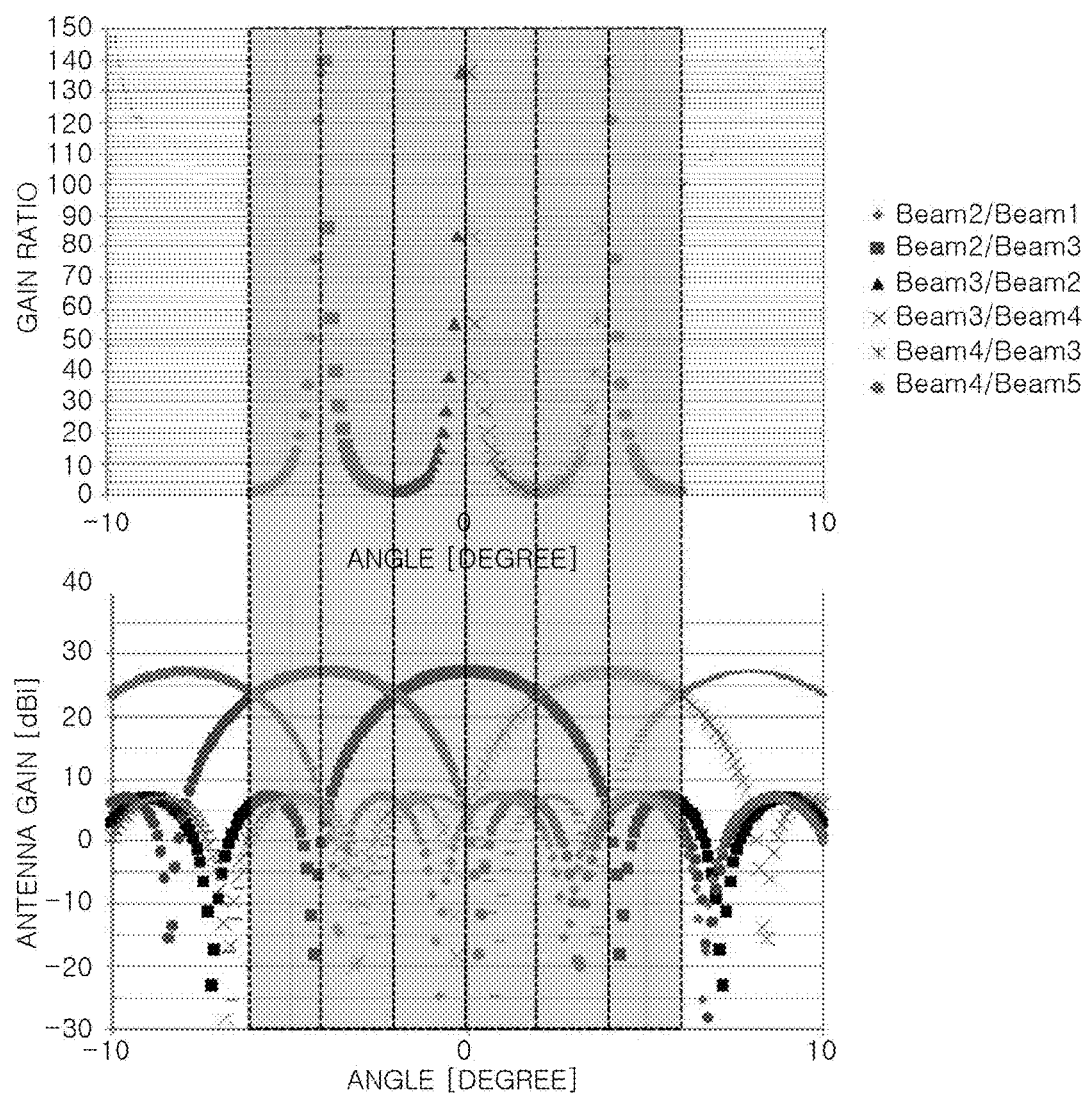
FIG. 8 illustrates an example of a beam pattern for each antenna beam index and a gain ratio of the target beam to the adjacent beam for each angle according to the embodiment of the present invention.

FIG. 8 illustrates an example of a beam pattern for each antenna beam index and a gain ratio of the target beam to the adjacent beam for each angle according to the embodiment of the present invention.

Specifically, a beam pattern for each antenna beam index is shown in the lower part of FIG. 8 which is the same as that shown in FIG. 5. From the beam pattern for each antenna beam index in the lower part of FIG. 8, a combination of the target beam having the largest gain and the adjacent beam having the second largest gain can be derived. Here, angle regions having the target beam and adjacent beam identical to one another (e.g., a region between −6° and −4°, a region between −4° and −2°, a region between −2° and 0°, a region between 2° and 4°, and a region between 4° and 6°) are indicated in FIG. 8. For example, in the region between −6° and −4°, a reception beam #2 is the target beam since the gain of the reception beam #2 is the largest, and a reception beam #1 is the adjacent beam since the gain of the reception beam #1 is the second largest.

Based on the beam pattern at the lower part of FIG. 8, the gain ratio of the target beam to the adjacent beam (i.e., a value obtained by dividing the gain of the target beam by the gain of the adjacent beam) can be calculated. This calculation can be performed by the beam pattern measuring unit 702, and the calculation results are stored in the storage unit 704. Here, since the beam pattern data are discretized values, the calculated gain ratios also indicate values discretized at predetermined angular intervals.

Figure 9:
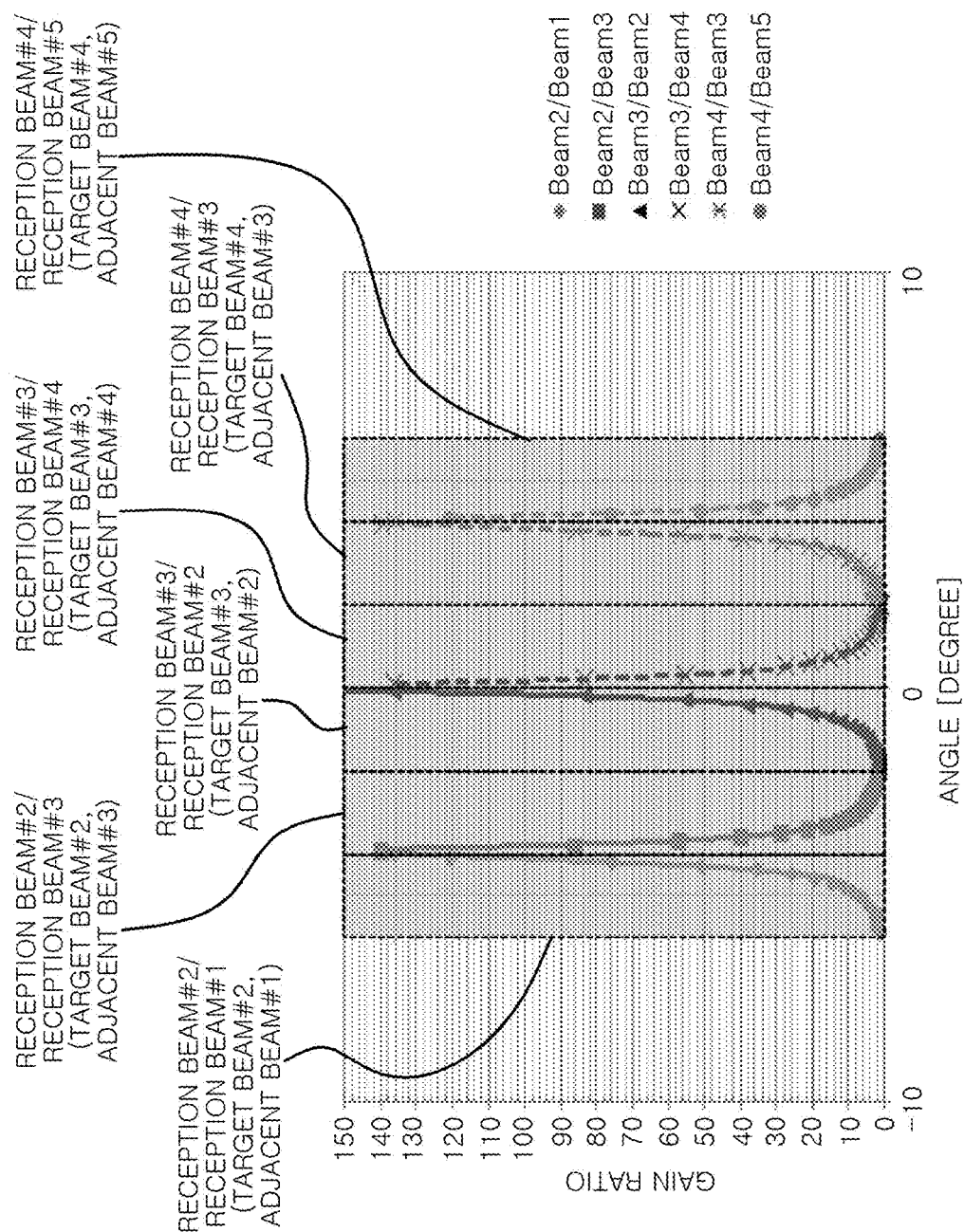
FIG. 9 shows a trendline for the gain ratio of the target beam to the adjacent beam for each angle shown in FIG. 8.

FIG. 9 shows a trendline for the gain ratio of the target beam to the adjacent beam for each angle shown in FIG. 8.

The trendline shown in FIG. 9 can be derived by employing curve fitting to data on the gain ratio of the target beam and the adjacent beam for each angle. The trendline is a function indicating a relationship between each angle and the gain ratio of the target beam and the adjacent beam, and can be expressed by various functions including a linear function, a polynomial function, and an exponential function and the like. Further, after the antenna is fabricated and before the system is operated, these trendlines may be databased through beam pattern measurement.

For example, the trendline in the region where the target beam and the adjacent beam derived from the data of the discretized gain ratio shown in FIG. 9 are a reception beam #3 and a reception beam #2, respectively (i.e., the region between −2° and 0°) may be expressed by the following Eq. 1:

$$x = \log_e(y/121.3)/2.6 \qquad \text{Eq. 1}$$

where x is the angle and y is the gain ratio of the reception beam #3 (i.e., the target beam) to the reception beam #2 (i.e., the adjacent beam). The trendline equation for each angle region may be derived by the beam pattern measuring unit 702 and stored in the storage unit 704.

Figure 10:
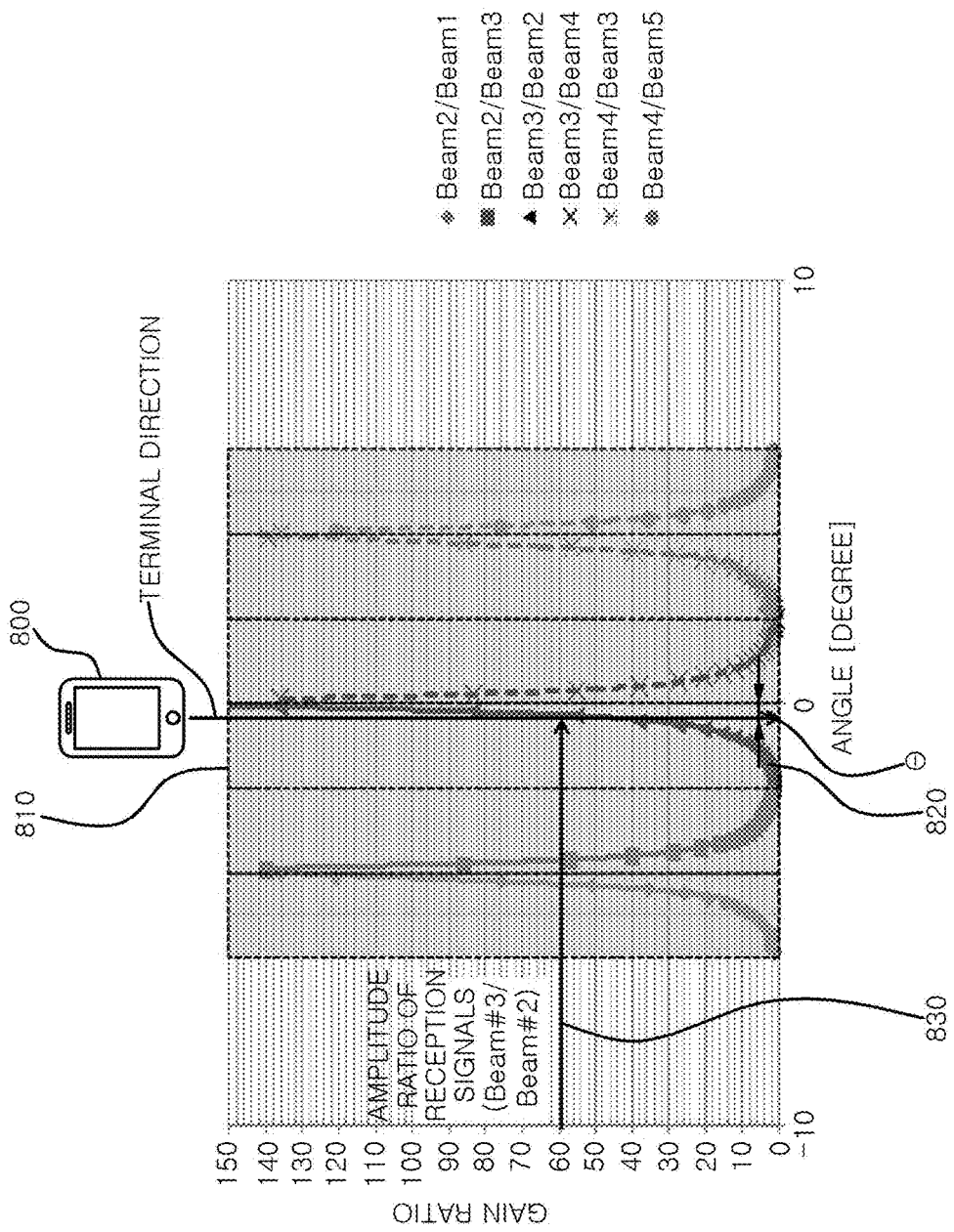
FIG. 10 is a view of explaining a method of estimating the direction of the terminal by using the trendline shown in FIG. 9 and ratios of amplitudes of reception signals according to the embodiment of the present invention.

FIG. 10 is a view of explaining a method of estimating the direction of the terminal by using the trendline shown in FIG. 9 and ratios of amplitudes of reception signals according to the embodiment of the present invention.

As an example, when a terminal 800 located at an angle (i.e., direction) as shown in FIG. 10 transmits a RACH preamble or a sounding reference signal in a state where the trendline equation for each angle region shown in FIG. 9 is derived in advance, the strongest signal can be received in the reception beam #3 and the second strongest signal can be received in the reception beam #2.

Therefore, with respect to the region 810 where the target beam is the reception beam #3 and the adjacent beam is the reception beam #2, the direction of the terminal, that is, the angle of arrival of the signal received from the terminal, can be estimated by using the trendline 820 derived in advance or the equation for the trendline 820.

Specifically, a value (hereinafter referred to as a ratio 830), which is obtained by dividing the amplitude of the reception signal received from the terminal through the reception beam #3 (i.e., the target beam) by the amplitude of the reception signal received from the terminal through the reception beam #2 (i.e., the adjacent beam) on the trendline for the region 810, is found in the vertical axis, and an angle value (θ) corresponding thereto is derived in the horizontal axis. That is, the direction corresponding to the angle value (θ) may be estimated as the direction of the terminal.

In this case, since the directional angle of the target beam (i.e., the reception beam #3) is 0', the derived angle value (θ) can be the offset value of the terminal with respect to the directional angle (0°) of the target beam (i.e., the reception beam #3).

For example, in case of using the trendline equation (1) described above, the direction of the terminal when the ratio 830 has a value of 60 can be estimated as follows:

$\log_e(60/121.3)/2.6 = -0.27$ (degrees).

Therefore, it is possible to quickly estimate the angle of arrival of the signal transmitted from the terminal by using the trendline equation derived in advance without having a complex calculation as compared with the maximum likelihood method.

Figure 11:
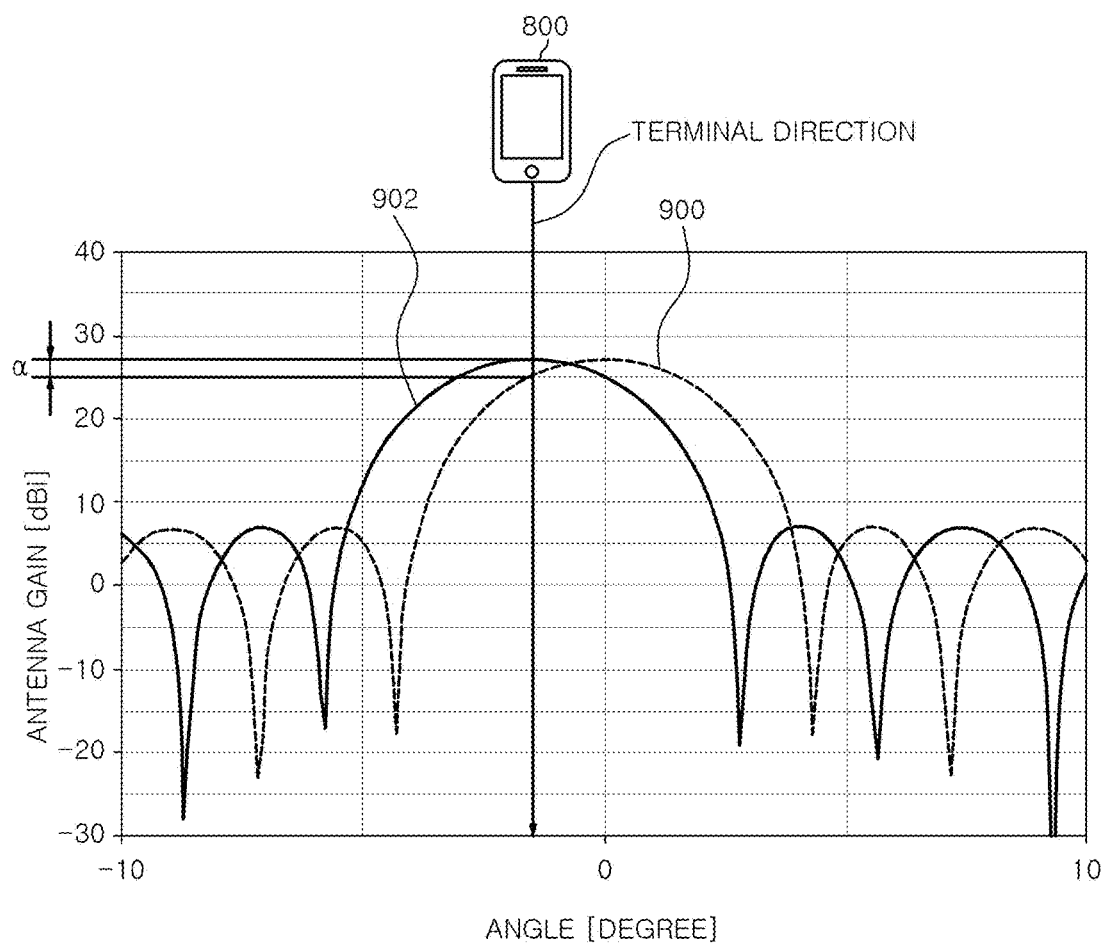
FIG. 11 is a view of illustrating a gain that is improved when a reception beam is generated in the direction of the terminal estimated according to the embodiment of the present invention.

FIG. 11 is a view of illustrating a gain that is improved when a reception beam is generated in the direction of the terminal estimated according to the embodiment of the present invention.

Referring to FIG. 11, when a reception beam 902 is generated to be directed in the estimated direction of the terminal according to the embodiment of the present invention, an antenna gain can be improved by a in the direction of the terminal 800 as compared with a case when an antenna beam 900 having the largest reception signal from the terminal 800 is used among the multiple beams generated by the beamforming unit 706 for the beam pattern measurements described with reference to FIGS. 7 and 8 (i.e., beam switching scheme).

Therefore, in accordance with the embodiment of the present invention, it is possible to provide a propagation environment superior to a method of selecting the reception beam 900 in the known beam switching scheme, and to estimate the direction of the terminal based on a simple equation (trendline equation). As a result, the rapid estimation for the direction of the terminal can be achieved as compared with the Maximum Likelihood method that requires complicated matrix calculation.

Figure 12:
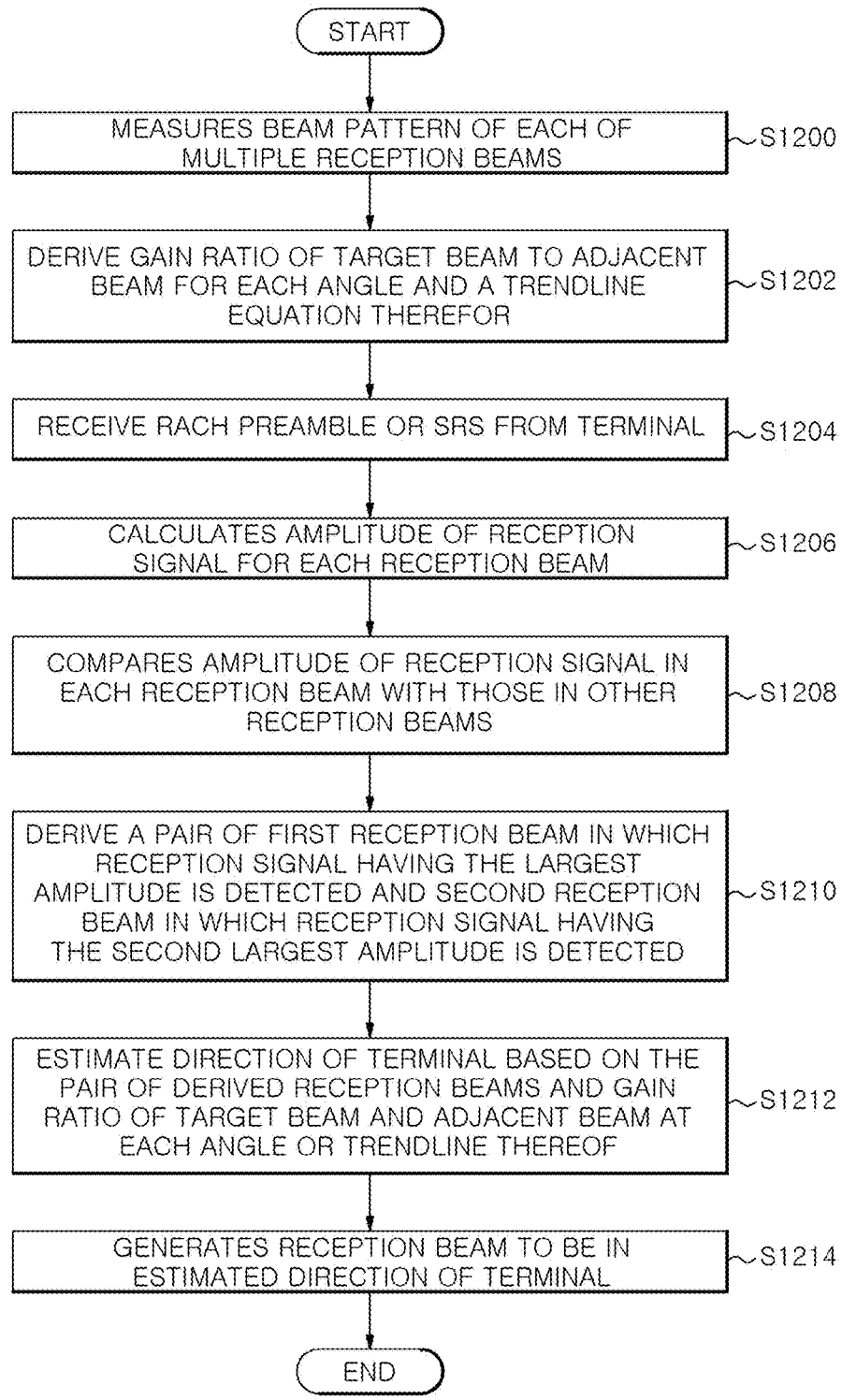
FIG. 12 is a flowchart of a method of estimating the direction of the terminal according to the embodiment of the present invention and generating an optimum reception beam based on the estimation.

FIG. 12 is a flowchart of a method of estimating the direction of the terminal according to the embodiment of the present invention and generating an optimum reception beam based on the estimation.

First, the beam pattern measuring unit 702 of the beamforming device 700 measures a beam pattern of each of multiple reception beams (S1200). In an exemplary embodiment of the present invention, for the sake of convenience in explanation, there is illustrated a measurement of a beam pattern for a reception beam of a base station antenna, the reception beam being generated to receive a signal transmitted from a terminal. However, the present invention is not limited thereto.

Next, based on the beam pattern of each of the multiple reception beams, the beam pattern measuring unit 702 derives a gain ratio of the target beam to the adjacent beam for each angle and a trendline equation therefor as shown in FIGS. 8 and 9 (S1202).

At this time, the information such as the gain ratio in the pattern for each combination of the target beam and the adjacent beam derived as described above and the trendline equation therefor is stored in the storage unit 704 of the beamforming device 700, and the stored information can be used by the control unit 710 in a step of estimating a direction of the terminal.

The beamforming device 700 can receive a RACH preamble or a sounding reference signal from the terminal 800 after deriving and storing the information on the gain ratio of the target beam to the adjacent beam for each angle and the trendline equation thereof (S1204).

Then, the signal strength measuring unit 708 calculates an amplitude of a reception signal (the RACH preamble or the sounding reference signal) received from the terminal 800 in each reception beam (S1206).

Thereafter, the beam deriving unit 712 compares the amplitude of the reception signal in each reception beam with those in other reception beams (S1208), and derives a pair of a target beam (i.e., a first reception beam) including a reception signal having the largest amplitude and an adjacent beam (i.e., a second reception beam) including a reception signal having the second largest amplitude (S1210).

Next, the control unit 710 estimates the direction of the terminal 800 by using the information on the pair of the target beam and the adjacent beam derived from the comparison between the amplitudes of the reception signals and the data on the gain ratio of the target beam and the adjacent beam for each angle or the trendline equation therefore as shown in FIGS. 8 and 9 (S1212).

Thereafter, the control unit 710 generates a reception beam again in the direction of the terminal estimated as described above (S1214). A transmission beam may be generated in the same manner.

Accordingly, since the antenna reception beam 902 that accurately coincides with the direction of the terminal is generated as shown in FIG. 11, it becomes possible to improve electric field strength for the transmission and the reception as compared with the known beam switching scheme in which a single antenna beam 900 is selected among multiple antenna beams in a fixed direction.

As described above, according to the embodiment of the present invention, in the higher frequency band-based wireless communication, it is possible to accurately estimate a location (direction) of the terminal with a relatively small amount of calculation by deriving, among multiple antenna reception beams, the first antenna beam through which the reception signal having the largest amplitude is transmitted to the base station from the terminal and the second antenna beam through which the reception signal having the second largest amplitude is transmitted to the base station from the terminal; calculating the ratio of the amplitude of the reception signal of the first antenna beam to the amplitude of the reception signal of the second antenna beam; using a function indicating a relationship between the calculated ratio and a gain ratio of a antenna target beam and an antenna adjacent beam for each angle, which is stored in advance, to generate an optimum antenna beam for a terminal location trace. Further, it is possible to overcome a high path loss problem in the higher frequency band-based wireless communication through the estimation of the terminal location, thereby ensuring a high received signal strength. Therefore, it is advantageous that an optimal wireless link between the base station and the terminal can be generated and maintained.

While the invention has been shown and described with reference to the preferred embodiments thereof, it will be understood by those skilled in the art that various changes and modifications may be made without departing from the spirit and scope of the invention. That is, in the embodiment of the present invention, a base station antenna reception beam among the various antenna beams has been described as an example for the sake of convenience in explanation, but it is also applicable to a terminal antenna reception beam. That is, the signal source may be a base station as well as a terminal or may be another station. In other words, according to the embodiment of the present invention, when a signal is received from a signal source, a direction of the signal source can be estimated by using an amplitude ratio of a reception beam (i.e., target beam) including a reception signal having the largest amplitude among the multiple reception beams to a reception beam (i.e., adjacent beam) including a reception signal having the second largest amplitude among the multiple reception beams. Further, the same can be applied to multi-beam operation in an antenna transmission beam between the terminal and the base station. Accordingly, the scope of the invention should not be limited by the illustrated embodiments but should be defined by the appended claims.

INDUSTRIAL APPLICABILITY

According to the embodiment of the present invention, a low latency service and a stable and improved wireless link can be provided and generated more easily in a high frequency band mobile communication system such as 5G communication system.

What is claimed is:

1. A beamforming device, comprising:
a beam deriving unit configured to derive, among multiple reception beams, a first reception beam through which a reception signal having the largest amplitude is received from a terminal and a second reception beam through which a reception signal having the second largest amplitude is received from the terminal; and
a control unit configured to estimate a direction of the terminal based on a ratio of the amplitude of the reception signal received through the first reception beam to the amplitude of the reception signal received through the second reception beam,
wherein the beamforming device further comprises:
a storage unit configured to store information on a gain ratio of the first reception beam to the second reception beam for each direction in a region where the first reception beam has the largest gain and the second reception beam has the second largest gain among the multiple reception beams,
wherein the control unit estimates the direction of the terminal, based on the information on the gain ratio of the first reception beam to the second reception beam for each direction in the region, which is stored in the storage unit, and the ratio of the largest amplitude of the reception signal received through the first reception beam to the second amplitude of the reception signal received through the second reception beam.

2. The beamforming device of claim 1, wherein the information further includes an equation for a relationship between the gain ratio of the first reception beam to the second reception beam and direction.

3. The beamforming device of claim 1, wherein the control unit calculates the ratio by dividing the amplitude of the reception signal received through the first reception beam by the amplitude of the reception signal received through the second reception beam and estimates the direction of the terminal based on the calculated ratio.

4. The beamforming device of claim 1, further comprising:
a beamforming unit configured to generate a reception beam having a directional angle of the estimated direction of the terminal.

5. The beamforming device of claim 1, further comprising:
a signal strength measuring unit configured to calculate an amplitude of a random access channel preamble or a sounding reference signal, which is received from the terminal through each of the multiple reception beams.

6. A beamforming method, comprising:
deriving, among multiple reception beams, a first reception beam through which a reception signal having the largest amplitude is received from a terminal and a second reception beam through which a reception signal having the second largest amplitude is received from the terminal;
estimating a direction of the terminal based on a ratio of the amplitude of the reception signal received through the first reception beam to the amplitude of the reception signal received through the second reception beam; and
generating a reception beam through which a reception signal having the largest amplitude is received in the estimated direction of the terminal,
wherein, in said estimating, the direction of the terminal is estimated based on information on a gain ratio of the first reception beam to the second reception beam for each direction in a region where the first reception beam has the largest gain and the second reception beam has the second largest gain among the multiple reception beams and the ratio of the amplitude of the reception signal received through the first reception beam to the amplitude of the reception signal received through the second reception beam.

7. The beamforming method of claim 6, wherein said estimating includes calculating the ratio by dividing the amplitude of the reception signal received through the first reception beam by the amplitude of the reception signal received through the second reception beam.

8. The beamforming method of claim 6, further comprising:
calculating an amplitude of a random access channel preamble or a sounding reference signal, which is received from the terminal through each of the multiple reception beams.

* * * * *